United States Patent [19]

White et al.

[11] Patent Number: 4,578,711
[45] Date of Patent: Mar. 25, 1986

[54] VIDEO DATA SIGNAL DIGITIZATION AND CORRECTION SYSTEM

[75] Inventors: James M. White, Charlotte; Ronald W. May, Matthews, both of N.C.; Michael D. Gulliver, Rockford, Mich.

[73] Assignee: International Business Machines (IBM), Armonk, N.Y.

[21] Appl. No.: 566,365

[22] Filed: Dec. 28, 1983

[51] Int. Cl.[4] .......................... H04N 1/40; H04N 1/04; H04N 1/10

[52] U.S. Cl. .................................... 358/282; 358/285; 358/293; 340/347 P

[58] Field of Search ............... 358/280, 282, 284, 285, 358/294, 293; 340/347 P

[56] References Cited

U.S. PATENT DOCUMENTS

| | | | |
|---|---|---|---|
| 3,159,815 | 12/1964 | Groce | 340/146.3 |
| 3,675,201 | 7/1972 | McKissick et al. | 358/285 |
| 3,723,649 | 3/1973 | Pitegoff et al. | |
| 3,800,078 | 3/1974 | Cochran et al. | |
| 3,829,853 | 8/1974 | Freedman | 340/347 |
| 3,952,144 | 4/1976 | Kolker | 358/282 |
| 4,023,160 | 5/1977 | Kirschner | 340/347 |
| 4,045,792 | 8/1977 | Schaefer et al. | 340/347 |
| 4,128,830 | 12/1978 | Weythman | 358/282 |
| 4,143,366 | 3/1979 | Lewis, Jr. | 340/347 |
| 4,149,143 | 4/1979 | Nagano et al. | 340/146.3 |
| 4,189,714 | 2/1980 | Adam | 340/347 |
| 4,216,503 | 8/1980 | Wiggins | 358/280 |
| 4,227,186 | 10/1980 | Aschwanden | 340/347 |
| 4,227,218 | 10/1980 | Vandling | 328/282 |
| 4,228,468 | 10/1980 | Nagano et al. | 358/280 |
| 4,251,837 | 2/1981 | Janeway, III | 358/280 |
| 4,287,536 | 9/1981 | Wiggins | 358/282 |
| 4,329,717 | 5/1982 | Logie et al. | 358/282 |
| 4,338,591 | 7/1982 | Tuthill | 340/347 |
| 4,343,021 | 8/1982 | Frame | 358/213 |
| 4,345,148 | 8/1982 | Pines et al. | 250/214 |

FOREIGN PATENT DOCUMENTS 2354520 6/1974 Fed. Rep. of Germany .
3239851 6/1983 Fed. Rep. of Germany .
2487613 1/1982 France .

OTHER PUBLICATIONS

European Search Report–Place of Search: Vienna Date: 3/25/85.

Primary Examiner—James J. Groody
Assistant Examiner—John K. Peng
Attorney, Agent, or Firm—Bell, Seltzer, Park & Gibson

[57] ABSTRACT

An analog video data signal digitization and correction system scans a medium to produce video data signals representing images printed on the medium. Two reference quantities representing analog reference signals produced by scanning a densely printed image and an area of the medium having no printed image are used to establish the maximum and minimum values of a range of possible values for each video data signal. The analog video data signals are compared with this range and a corrected digital value obtained for each data signal depending on its position in the range. In generating the reference quantities each analog reference signal is converted into a digital reference signal dependent on the position of the analog signal in a range of possible values. For each analog reference signal only a portion of the range of possible values is selected in order to increase the accuracy of the corresponding digital reference signal. The number of bits in the digital reference signal is kept low but the accuracy of each digital reference signal remains high. In converting each digital reference signal into an analog reference quantity additional high order bits are added to the digital reference signal so that each analog reference quantity has the same accuracy as its corresponding digital reference signal.

5 Claims, 3 Drawing Figures

VIDEO DATA SIGNAL DIGITIZATION AND CORRECTION SYSTEM

FIELD OF INVENTION

The present invention relates to a system for digitizing and correcting analog video data signals derived from scanning a medium on which have been printed images, for example text, drawings or photographs. Such data signals could be used for example for transmission so that the images could be reproduced on another medium locally or at another location, or for recognition of certain parts of the image, for example characters in the text or diagrams.

BACKGROUND OF THE INVENTION

A scanning system used to produce video data signals of the above type typically comprises a light source for illuminating the medium on which the images are printed and a scanner device including a plurality of sensing devices each adapted to receive light reflected from a respective discrete portion of the surface of the medium and to generate video data signals representative of the density of the element of the image printed on that discrete portion of the surface of the medium. The scanning device may be a single row of sensing devices which is moved across the medium in order to scan over the whole of the medium. The analog video data signal output of each sensing device is converted into a digital signal and represents on a grey scale the density of the element of the image printed on the discrete portion of the medium from which light is received by that sensing device.

Since there may be variations in the level of illumination of each portion of the surface of the medium and variations in the sensitivity of each sensing device and in the value of its output when it receives no illumination and inaccuracies in any associated optical system, it is necessary to correct the output video data signal generated in each sensing device in order that the set of video data signals produced by the scanning system accurately represents the image printed on the medium.

In order to correct the video data signal generated in each sensing device it is known to use the values of the signals generated when sensing light in two reference conditions corresponding respectively to the absence of any printed image element and to the presence of a densely printed image element on the medium in order to derive two reference quantities. When subsequently scanning a printed medium, the video data signal produced for each discrete portion of the medium is compared with these two reference quantities and a corrected value for the signal obtained. The corrected value is a digital signal. This correction operation ensures that all the video data signals from the sensing devices accurately represent the elements of the image scanned.

The digitization and correction operation utilizes an analog to digital converter and comparator unit. This unit is supplied with two reference quantities establishing the maximum and minimum values of a range of values. This range is divided into a number of discrete levels. An input analog signal to the unit is compared with these discrete levels and the corresponding level determined. A digital signal representing the corresponding level is the output from the unit. The number of bits in the digital signal defines the number of discrete levels in the range. The difference between adjacent levels, which defines the accuracy of the output signal, is dependent on the number of levels and the length of the range. For a given range the accuracy is increased by increasing the number of bits. However analog to digital converters of this type become increasingly more expensive and complicated to manufacture as the number of bits in the output signal increases.

In order to produce corrected values for video data signals, two reference quantities as described above are supplied to a unit of the above type to define the range with which the video data signals are compared. The corrected values are produced in the form of digital output signals.

It is convenient to use the same unit to establish the reference quantities. For efficient operation of the system it is necessary for the reference quantities to be established very accurately. However as indicated above achieving this accuracy by increasing the number of bits in the digital output signal is expensive and complicated.

The object of the present invention is to provide an improved analog video data signal digitization and correction system of the above type which utilizes an analog to digital converter operating with a relatively small number of bits while still producing the digital reference quantities with a relatively high accuracy.

SUMMARY OF THE INVENTION

The present invention relates to an analog video data signal digitization and correction system which includes a scanning means formed with a plurality of sensing devices for scanning a medium to produce analog video data signals representative of images printed on said medium. The system also includes a reference quantity generating means for generating for each sensing device two reference quantities for use in correcting and digitizing the video data signals. These reference quantities are representative respectively of the reference signals produced by the sensing device when scanning two reference types of image and are used to establish for the video data signals a range of possible values between maximum and minimum values defined by said reference quantities. The video data signals are compared with the range of possible values to generate for each video data signal a corrected value based on the position of the video data signal in the range. The reference quantity generating means generates two analog reference signals and generates for each analog reference signal a digital reference signal having N bits representative of the position of the analog signal in a range of possible values. The accuracy of this digital reference signal is dependent upon the value of N and the length of the range selected. The digital signals are stored and when needed are converted into analog reference quantities for use in correcting the video data signals. In accordance with the invention, in generating each digital reference signal only a portion of the possible range of values is used in order to establish a relatively high accuracy for the digital reference signal with a relatively low value of N. In converting the digital reference signal into the analog reference quantity extra high order bits are added into the N bit signal so that the accuracy of the analog reference quantity is substantially equal to the accuracy of the digital reference signal.

In generating each digital reference signal, the analog reference signal is compared with a range of possible values. The number of bits in the digital signal governs the number of possible values for the digital reference signal and the difference between adjacent values. The size of this difference depends on the length of the range of possible values. The accuracy of the digital reference signal is dependent on the size of this difference and can therefore be increased by increasing the number of bits and by decreasing the length of the range. In accordance with the invention the length of the range is appreciably decreased but a low number of bits is used in the digital signal. With this arrangement a relatively high accuracy is maintained.

In accordance with a preferred embodiment of the invention the analog reference signals are assumed to lie respectively in the upper quarter and the lower quarter of the range of possible values and only these quarters are selected for deriving the digital reference signals. As a result the accuracy which would have been obtained using the full range of possible values and an 8-bit digital signal is obtained using only a quarter of the range and a 6-bit signal.

BRIEF DESCRIPTION OF THE DRAWINGS

In order that the invention may be more readily understood reference will now be made to the Figures in the accompanying drawings, in which.

DETAILED DESCRIPTION

Figure 1:
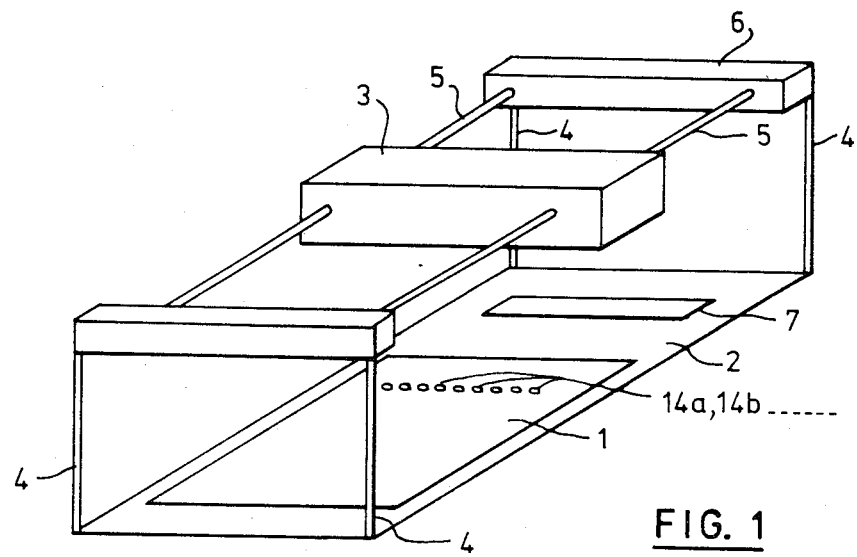
FIG. 1 is a general view of a scanning system which can be used to implement the invention.
Figure 2:
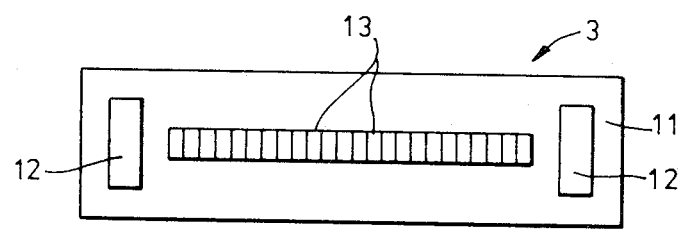
FIG. 2 is a detailed view from below of the scanner device used in the system of FIG. 1.

The present invention can be implemented in a scanning system as illustrated diagrammatically in FIGS. 1 and 2.

FIG. 1 illustrates a scanning system for scanning images printed on a medium 1 such as a sheet of paper. The system includes a base plate 2 on which the medium 1 can be supported and a scanner 3 adapted to illuminate the medium 1 and to receive light reflected off each portion of the surface of the medium. The scanner, which will be described in more detail with reference to FIG. 2, is supported from the base plate 2 by four pillars 4 and two cross members 5. The cross members 5 are threaded and can be rotated by a motor 6. The scanner 3 is designed to cooperate with the threaded cross members 5 so that as the cross members are rotated the scanner 3 moves along the cross members and scans over the medium 1. At one end of the base plate 2 is mounted a reference surface 7 which is colored so that its approximates to the color of the unprinted areas of the medium 1. The system described is housed in a light proof container (not illustrated).

FIG. 2 is a view of the scanner 3 from underneath. The scanner has an elongated body 11 on which are mounted two identical light sources 12 and a plurality of light sensitive sensing devices 13, for example charge coupled devices. In a practical embodiment there are 2048 sensing devices extending in a single row along the body 11. The scanner 3 is provided with an optical system so that each sensing device receives light from only a respective discrete portion of the surface of the medium 1. As can be seen from FIG. 1 when the light sources 12 illuminate the medium 1 the row of devices 13 receives light reflected from a row of discrete portions 14a, 14b, . . . of the surface of the medium extending across the medium. As the scanner 3 is moved over the medium 1 the row of discrete portions 14 from which reflected light is received moves over the medium so that at the end of this movement light has been received by the sensing devices from the whole of the surface of the medium 1.

Each sensing device 13 produces a signal representative of the intensity of the light reflected from the associated discrete portion of the surface of the medium 1. This signal is therefore representative of the density of the element of the image printed on that discrete portion of the medium. Since the gain and sensitivity may not be the same for each sensing device and since the level of illumination may not be the same for each portion of the medium it is necessary to correct the values of the signals generated in each sensing device. The values of the signals generated as the scanner moves over the medium are compared with reference quantities in order to obtain corrected values for the signals in a correction system to be described below.

In order to set up the correction system it is necessary to obtain for each sensing device the two reference quantities as follows. With the light sources 12 switched off the value of the signal generated by each sensing device 13 is measured and this is stored as a "black" reference quantity. The light sources 12 are then switched on and left to stabilize and the scanner 3 moved to the end of the base plate 2 so that each sensing device 13 receives light reflected from off the reference surface 7. The value of the signal generated by each device 13 is measured and this is stored as the "white" reference quantity.

In an alternative arrangement the "black" reference quantity is obtained by providing an additional reference surface on the base plate 2. This additional reference surface is not illustrated but is similar to reference surface 7 and is colored so that it approximates to the color of the densely printed image areas of medium 1. The light sources 12 are switched on and left to stabilize and the scanner 3 moved over the base plate 2 until each sensing device 13 receives light reflected from off the additional reference surface.

It will be appreciated that a "black" and a "white" reference quantity are stored for each of the sensing devices 13.

Figure 3:
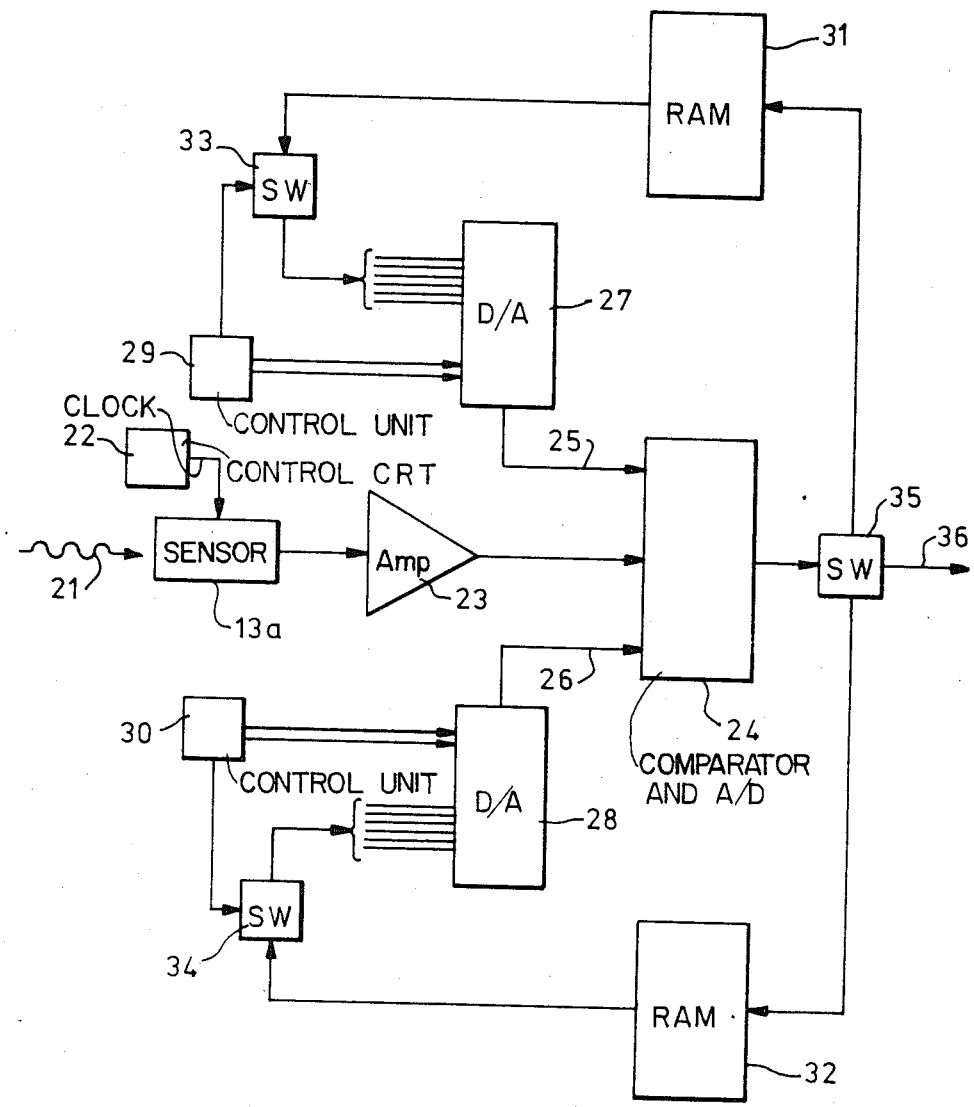
FIG. 3 is a diagram of the digitization and correction circuit used with the scanning system of FIG. 1.

FIG. 3 illustrates how the signals from each one of the sensing devices 13 is handled in accordance with circuitry embodying the invention. Only one device 13a and its associated circuitry is illustrated but it will be appreciated that the signals from all the other devices are handled in the same way.

As illustrated in FIG. 3 the sensing device 13a receives light 21 reflected from a discrete portion 14a of the surface of the medium 1. A control circuit 22 provides clock timing pulses to gate the output from device 13a which is an analog voltage signal representing the intensity of the light 21 and therefore the density of the image element on the discrete portion 14a. This signal is formed into pulses by the clock timing pulses. The amplitude of the voltage signal, for example, is between 0 and 1 volts dc with a constant large dc offset and includes a noise component. This signal is passed through a filter and amplifier unit 23 to remove the noise component and the dc offset and to amplify the signal up to a maximum of 10 volts dc with the correct polarity for the remaining components.

The output from unit 23 is supplied to a comparator and analog to digital converter unit 24. Unit 24 is supplied with two reference voltages on lines 25, 26 from two digital to analog converters 27, 28 respectively.

Each of the digital to analog converters 27, 28 operates in response to an 8-bit input to produce an output voltage in the range 0 to 10 volts dc. For example with an input of 11111111 the output is 10 volts and with an input of 00000000 the output is 0 volts.

The input to each of the converters 27, 28 comes from two sources. The two most significant bits of the input can be selected by means of a respective one of two control units 29, 30. The remaining six bits of the input are supplied from a respective one of two RAM storage devices 31, 32 or are selected by the corresponding control unit 29, 30 through a suitable switching unit 33, 34.

The signals on lines 25, 26 define the two ends of a voltage range which is divided in unit 24 into 64 different voltage levels with equal steps between adjacent levels. Each one of these voltage levels is represented by a 6-bit digital signal. The input to unit 24 from amplifier unit 23 is compared with these 64 voltage levels and the corresponding voltage level determined. The output from unit 24 is the 6-bit signal representing the corresponding voltage level. This 6-bit output signal can be supplied selectively through a switching unit 35 either to one of the storage devices 31, 32 or as an output 36 from the apparatus.

The apparatus described is used as follows:

In order to establish reference quantities for the value of the signal generated by each sensing device 13, initially a reference setting operation is performed.

The light sources 12 are initially switched off and no light is received by the devices 13 and the signal generated by each sensing device is dependent upon the dark current (leakage) characteristic of the sensing device. Alternatively, as described above, the light sources 12 are switched on and the scanner 3 is moved until the discrete portions 14 are located on the additional reference surface and the signal generated by each sensing device is dependent upon the dark current (leakage) characteristics of the sensing device, the color of the surface, the intensity of the illumination, the sensitivity of the sensing device and the associated optical system characteristics.

Control unit 29 and switching unit 33 are set so as to supply an input of 00111111 to digital to analog converter 27 so as to produce a reference voltage of 2.5 volts on line 25. Control unit 30 and switching unit 34 are set so as to supply an input of 00000000 to digital to analog converter 28 to produce a reference voltage of 0 volts on line 26. These input reference voltages are selected because it is assumed that the value of the input signal from unit 23 will be between 0 and 2.5 volts out of the possible range of 0 to 10 volts in the conditions established. This reduced length range is divided into 64 voltage levels as described above.

The analog voltage signal generated by sensing device 13a in these conditions of minimum light being received is supplied to unit 24 and the corresponding voltage level in the range defined by the voltage signals on lines 25, 26 is determined. The resultant 6-bit output signal represents the corrected value of the output signal generated in the sensing device corresponding to the receipt of minimum light from a discrete portion of the surface of the medium printed with a very dense image element. This 6-bit digital signal is supplied through switching unit 35 to storage device 32 to be stored as a "black" reference.

The first part of the reference setting operation having been completed the light sources are switched on. The scanner 3 is then moved until the discrete portions 14 are located on the reference surface 7 and the signal generated by each sensing device is dependent upon the color of the surface 7, the intensity of illumination, the sensitivity of the sensing device and the associated optical system characteristics. Control unit 29 and switching unit 33 are set so as to supply an input of 11111111 to digital to analog converter 27 to produce a reference voltage of 10 volts on line 25. Control unit 30 and switching unit 34 are set so as to supply an input of 11000000 to digital to analog converter 28 to produce a reference voltage of 7.5 volts on line 26. These input reference voltage values are selected because it is assumed that the value of the input signal from unit 23 will be between 7.5 and 10 volts out of the possible range of 0 to 10 volts in the conditions established. This reduced length range is divided into 64 voltage levels as described above.

The analog voltage signal generated by sensing device 13a in response to the receipt of the light reflected off surface 7 is supplied to unit 24 and the corresponding voltage level in the range defined by the voltage signals on lines 25, 26 is determined. The resultant 6-bit output signal represents the value of the output signal generated in the sensing device corresponding to the receipt of maximum light from a discrete portion of the medium on which no image has been printed. This 6-bit digital signal is supplied through switching unit 35 to storage device 31 to be stored as a "white" reference quantity.

In performing this initial reference setting operation it is assumed that the analog voltage signal representing the "white" reference quantity will be between 7.5 and 10.0 volts dc and that the analog voltage signal representing the "black" reference quantity will be between 0 and 2.5 volts dc. In each of these ranges of 2.5 volts, 64 discrete voltage levels are established and the input signal to unit 24 is compared with these 64 levels and the corresponding level determined. The voltage step between adjacent levels is (2.5/64) volts which equals 0.04 volts approximately. As a result each reference quantity is established to an accuracy of ±0.02 volts approximately. If the full range of 10.0 volts had been used to establish each reference quantity and had been divided into 64 steps using 6-bit digital signals the voltage step between adjacent voltage levels would have been (10.0/64) volts which equals 0.16 volts approximately. This arrangement would result in each reference quantity being established to an accuracy of ±0.08 volts approximately.

If an 8-bit analog to digital converter had been used in unit 24 and for each of the calculations to establish the reference quantities and a range of 0 to 10.0 volts had been used, this range would have been divided into 256 discrete voltage levels. The voltage step between adjacent voltage levels would have been (10.0/256) volts which also equals 0.04 volts approximately. Therefore with this arrangement also each reference quantity would have been established to an accuracy of ±0.02 volts approximately.

Therefore by using a 6-bit analog to digital converter and selecting a reduced voltage range of 2.5 volts for the calculation of each reference quantity, the accuracy of the resultant reference quantities is the same as would have been obtained by using an 8-bit analog to digital converter and the full voltage range of 10.0 volts.

Having completed the initial reference setting operation described above the apparatus can be used to produce corrected video data signals resulting from scanning the image on the medium 1. When the scanner 3 is moved so that the discrete portions 14 coincide with the image the light reflected from each discrete portion will be representative of the density of each element of the image printed on that portion. Sensing device 13a will produce an analog voltage video data signal to unit 24 which is to be compared with the voltage range defined by the white and black reference quantities stored in storage devices 31, 32 to provide a corrected value which accurately represents the density of the element of the image scanned on a grey scale taking into account the characteristics of the sensing device.

In order to perform this comparison operation, control unit 29 is set to produce two "1" bits for use as the two most significant bits of the input to digital to analog converter 27 and the remaining six bits input to converter 27 are obtained through switching unit 33 from storage device 31. Also control unit 30 is set to produce two "0" bits for use as the two most significant bits of the input to digital to analog converter 28 and the remaining six bits input to converter 28 are obtained through switching unit 34 from storage device 32.

As pointed out above when the reference quantities in storage devices 31, 32 were developed in the initial reference setting operation it was assumed that the "white" reference quantity in storage device 31 would be of a certain minimum value (7.5 volts) and that the "black" reference quantity in storage device 32 would be of a certain maximum value (2.5 volts). This enabled the reference quantities to be generated with an accuracy of ±0.02 volts approximately and stored as 6-bit digital signals. By combining the 6-bit signals from the storage devices 31,32 with the 2-bit signals from the control units 29,30, 8-bit signals are generated for input into the digital to analog converters 27,28. These digital signals are converted into reference voltages in the range 0 to 10.0 volts for input into unit 24 at 25,26. Since these reference voltages are represented by 8-bit digital signals there are a possible 256 different levels for each reference voltage. Since these levels extend equally over the range 0 to 10.0 volts the step between adjacent levels is (10.0/256) volts which is approximately 0.04 volts. Therefore these reference voltages have an accuracy of ±0.02 volts approximately and define a voltage range with which the input from amplifier unit 23 can be compared.

The analog voltage signals generated by sensing device 13a as it scans over the portions of the medium 1 containing the image, with the timing pulses from control circuit 22 being synchronized with the scanning movement, are compared in unit 24 with the voltage range defined by the reference voltages on lines 25,26. This voltage range is divided into 64 voltage levels since 6-bit digital signals are used in unit 24. The output is a series of 6-bit digital signals representative of the voltage levels which correspond to each input voltage signal produced as the scanning of medium 1 continues.

The apparatus therefore produces for each voltage signal from the sensing device 13a a corrected value which takes into account the sensitivity and dark current of the sensing device and the level of illumination of the portions of the medium which are scanned by the sensing device. The corrected value is one of 64 possible values.

During the operation of scanning the image on medium 1 and generating video data signals the reference setting operation can be performed as many times as needed. It will clearly need to be performed before any image scanning takes place. Subsequently it could be performed at preset occasions during the scanning of the medium. This will account for variations in the characteristics of the sensing devices and the level of illumination.

The black and white reference quantities for each of the sensing devices will be stored in the storage devices 31, 32 and can be used as references for the analog signals from all the sensing devices 13 of the scanner 3 by suitable selection and switching of the outputs from the sensing devices. Since the outputs from the sensing devices are produced sequentially, only one set of circuit elements as described in FIG. 3 will therefore be needed for all the sensing devices of the scanner 3.

What is claimed is:

1. An analog video data signal digitization and correction system comprising
    scanning means including a plurality of sensing devices for scanning a medium to produce video data signals representative of images printed on said medium,
    reference quantity generating means for generating for each sensing device two reference quantities representative respectively of the reference signals produced by said sensing device when scanning two reference types of image and for utilizing said reference quantities to establish for said video data signals a range of possible values between maximum and minimum values defined by said reference quantities,
    and means for comparing said video data signals with said range of possible values to generate for each analog video data signal a corrected digital value based on the position of said video data signal in said range,
    said reference quantity generating means including means for generating two analog reference signals, means for generating for each analog reference signal a digital reference signal having N bits representative of the position of said analog signal in a range of possible values, the accuracy of said digital reference signal being dependent upon the value of N and the length of the range selected, and means for storing said digital signals and for converting said digital signals into analog reference quantities,
    characterized in that said digital reference signal generating means includes means for selecting and utilizing only a portion of the possible range of values in order to establish a relatively high accuracy for the digital reference signal with a relatively low value of N, and in that said means for converting said digital reference signal into said analog reference quantity includes means for combining and converting extra high order bits into said N bit signal so that the accuracy of said analog reference quantity is substantially equal to the accuracy of said digital reference signal.

2. An analog video data signal digitization and correction system as claimed in claim 1 in which said digital reference signal generating means utilizes one end quarter of the range of possible values in order to generate one digital reference signal and the opposite end quarter of the range of possible values in order to generate the other digital reference signal and said means for converting said digital reference signal into said analog reference quantity combines and converts two extra high order bits into said N bit digital signal.

3. An analog video data signal digitization and correction system as claimed in claim 2 in which N equals 6.

4. An analog video data signal digitization and correction system as claimed in any one of the preceding claims in which said two reference types of image utilized by said reference quantity generating means are respectively the absence of any printed image and the presence of a densely printed image.

5. An analog video data signal digitization and correction system comprising a scanner having a plurality of light sensitive devices for producing analog electrical video data signals as a function of light incident thereon, means for storing black and white reference quantities for each of said devices, and means responsive to the analog signal from one of said devices and to the reference quantities associated with said one of said devices for producing a corrected digital signal, wherein the improvement comprises:

an analog to digital converter having maximum and minimum end limit input terminals and producing a digital output signal of N binary bits, high and low order digital to analog converters each having digital input terminals for (N +M) binary bits and having analog output terminals connected to respective ones of said end limit input terminals, means for operating said system in one of a black reference quantity setting mode, a white reference quantity setting mode, and a video data signal capture mode, first scanner control means operative (a) in said black reference quantity setting mode to expose said light sensitive devices to light transmitted from a black reference image, (b) in said white reference quantity setting mode to expose said light sensitive devices to light transmitted from a white reference image, and (c) in said image capture mode to expose said light sensitive devices to light transmitted from successive incremental lines of an image original, converter control means operative (a) in said black reference quantity setting mode to set the M high order bits of both said digital to analog converters to black indicating binary values and the remaining N bits of said converters to dark and light indicating values to produce and store N bit black reference quantities for each light sensitive device, (b) in said white reference quantity setting mode to set the M high order bits of both said digital to analog converters to light indicating binary values and the remaining N bits of said converters to light and dark indicating values to produce and store N bit white reference quantities for each light sensitive device, and (c) in said image capture mode, for each light sensitive device in succession, to set the M high order bits of the input terminals of said high order digital to analog converter to white indicating values, to set the M high order bits of the input terminals of said low order digital to analog converter to black indicating values, and to load the remaining N bits of said input terminals respectively with the N bit bytes of the white and black reference quantities associated with said light sensitive device.

* * * * *